UNITED STATES PATENT OFFICE.

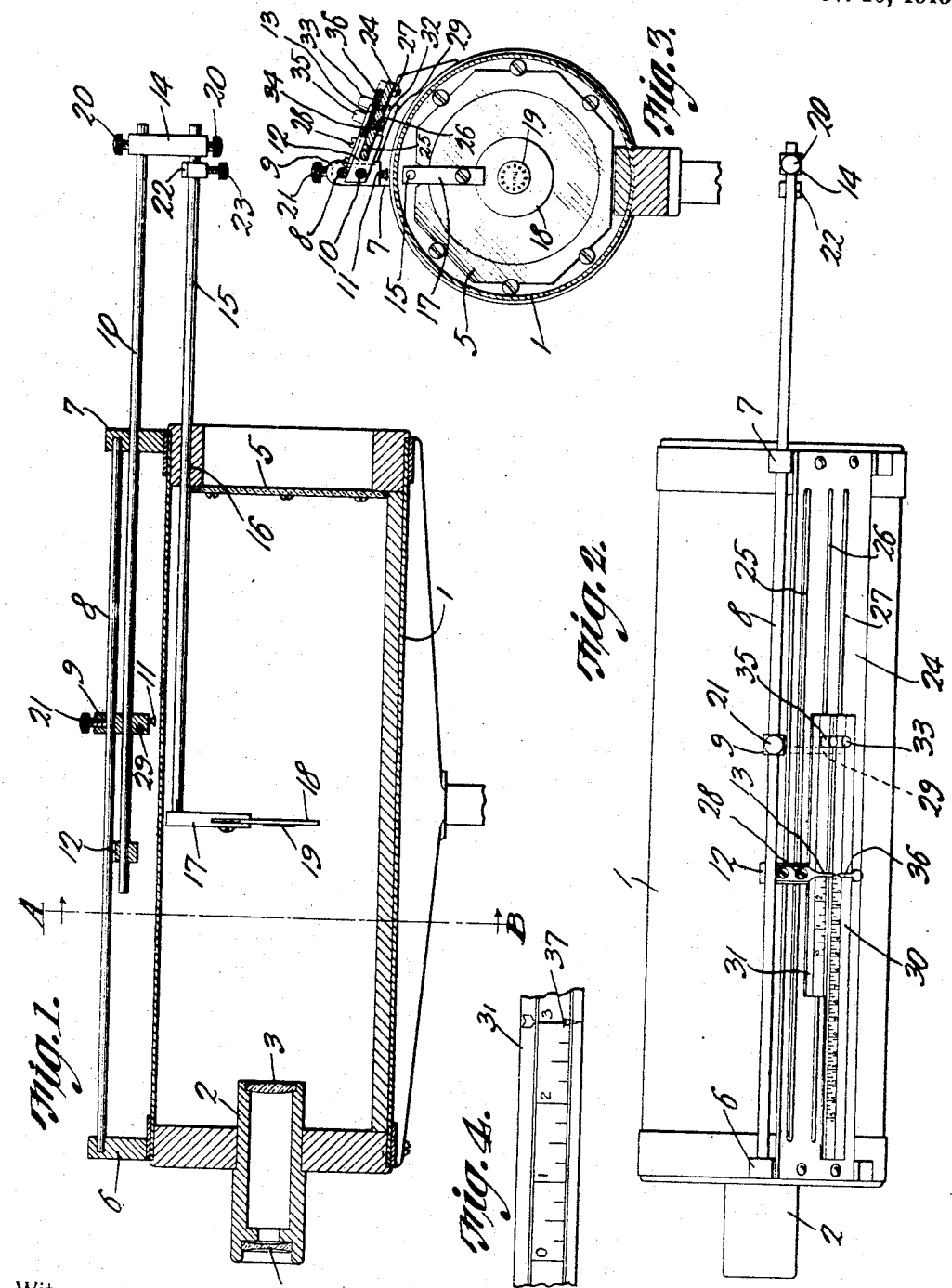

JACOB E. GOODMAN, OF DECATUR, GEORGIA.

OPTOMETER.

1,160,710.

Specification of Letters Patent. Patented Nov. 16, 1915.

Application filed July 8, 1915. Serial No. 38,713.

*To all whom it may concern:*

Be it known that I, JACOB E. GOODMAN, a citizen of the United States, residing at Decatur, in the county of Dekalb and State of Georgia, have invented a new and useful Optometer, of which the following is a specification.

This invention relates to optometers and is more especially designed as an improvement upon the structure disclosed in Patent #922,276 issued to me on May 18, 1909, one of the objects of the invention being to provide a simplified mechanism utilizing sliding scales whereby it becomes possible readily to determine the *punctum remotum*, or far point of distinct vision and the *punctum proximum*, or near point of distinct vision.

A further object is to provide a mechanism of this character for accurately indicating in diopters and fractions thereof, the presence of hypermetropia, myopia, presbyopia, and astigmatism as well as the amplitude of accommodation, it being unnecessary to use distant measurements.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical longitudinal section through the apparatus, the parts being set at the point of infinity. Fig. 2 is a plan view. Fig. 3 is a section on line A—B Fig. 1. Fig. 4 is a plan view of a portion of the presbyopic scale and showing the pointer thereon.

Referring to the figures by characters of reference 1 designates a casing preferably cylindrical and which may be mounted on any suitable support, this casing being provided at one end with a lens tube 2 holding an inner bi-convex lens 3, and at its outer end a bi-concave lens 4, the far end of the casing being provided with a window or glass covered opening 5. Mounted on the end portions of the casing are brackets 6 and 7 connected by a guide rod 8 which is parallel with the longitudinal axis of the casing 1. Mounted to slide on this rod 8 is a block 9 through which extends a slidable rod 10, the block being preferably fixedly connected to the rod 10 by means of a set screw 11. This rod 10 is slidably mounted in the bracket 7 and is provided, at one end, with a block 12 carrying a slidable pointer 13 while secured to the other end of the slidable rod 10 is a head 14. Extending from this head and parallel with the rod 10 is a target supporting rod 15 slidably mounted in an opening 16 provided in the adjacent end of the casing 1. Depending from the inner end of the rod 15 is an arm 17 to which is secured an opaque disk 18 carrying an optical chart 19 on which appear the radially disposed groups of lines used in tests for astigmatism and on which also appear letters to be used in other tests. The center of the target is diposed in line with the axes of the lens. As shown in the drawings, the two rods 10 and 15 can be adjustably connected to the head 14 and secured by set screws 20. Furthermore a set screw 21 may be arranged in the block 9 for engaging the guide rod 8 whenever it is desired to lock the target in any position to which it may be moved. Arranged on the supporting rod 15 is a stop block 22 which can be held against movement relative to said rod by a set screw 23. This stop block is adapted to come into contact with the end of casing 1 when the target 19 is located one diopter from the bi-convex lens 3.

Secured upon the brackets 6 and 7 is a combined guiding and supporting plate 24 provided with parallel slots 25, 26 and 27 respectively. The block 12 straddles the plate 24 and the slot 25 receives a guide screw 28 or the like which extends through the block and through the plate 24 and serves to hold the pointer 13 to the block 12. A stop finger 29 is secured rigidly to the lower portion of block 9 and extends under the plate 24.

Slidably mounted on the plate 24 is a main scale 30 and a supplemental scale 31. Scale 30 is held to the plate 24 by the enlarged lower end of a stud 32, this stud projecting through the slot 27 and having an enlarged upper portion forming a knob or handle 33 whereby the scale can be shifted readily longitudinally of the plate 24. The supplemental scale or slide 31 is connected to plate 24 in a similar manner, there being a stud 34 extending through the slot 26 and provided with an enlarged lower end, while the upper end of the stud forms a knob or handle 35 whereby the slide can be readily shifted longitudinally of the plate 24. Any suitable additional means may be used for holding the slides to the plate, but it is not deemed necessary to describe or illustrate them in detail. The lower ends of the studs 32 and 34 are so positioned that, under certain conditions, they will be brought against the stop finger 29, as hereinafter pointed out.

The main scale 30 is used in making tests for hypermetropia, myopia, astigmatism, and the amplitude of accommodation. This main scale or slide is provided with graduations dividing it into diopters and fractions thereof, the said diopters ranging from 0 to 15.00, and being so located upon the scale that when said main scale is shifted to the extreme left, the first graduation on the scale will register with a fixed pointer 36 mounted on plate 24 and which indicates the point of infinity.

The supplemental scale 31 has a series of graduations covering a length of 5.00 diopters, but the graduations merely designate 3.00 diopters instead of 5.00 diopters, these 3.00 diopters being sixty per cent. of 5.00 diopters, the actual length, thus leaving the balance of forty per cent. for the accommodation of the crystalline lens of the eye. The main scale 30 is adapted to slide on plate 24 a distance of 15.00 diopters. In other words, when scale 30 is at one extreme position, the first graduation thereon will register with the pointer 36, whereas when it is in its other extreme position, the last graduation will register with the pointer 36. The secondary scale, which is known in the profession as the presbyopic scale, is adapted to move through the space of 30.00 diopters.

Before starting any tests with the apparatus, the pointer or indicator 13 is drawn to the extreme right of the casing so that the block 9 will be brought against the bracket 7. This movement of the index or pointer 13 will result in a corresponding movement of block 9 and rod 10 and consequently, the finger 29 will be brought against the depending portions of studs 32 and 34 with the result that the main and supplemental slides 30 and 31 will be drawn to the extreme right of the plate 24. With the parts thus positioned, the patient is directed to place the eye against the tube 2 and to look through the lenses 4 and 3. The rod 10 is then pushed toward the patient, causing the pointer or index 13 to travel therewith and also causing the target 19 to move gradually into the range of vision. This movement is continued until the patient can first determine the characters on the chart. If, at this time, the indicator or pointer 13 is at the right of pointer 36, it will be shown that the patient is afflicted with hypermetropia or far-sightedness, whereas if the indicator 13 is brought to a position at the left of pointer 36 it will be indicated that the patient is afflicted with myopia or near-sightedness. If, for example, the test shows hypermetropia, the amount thereof can be quickly determined simply by moving the slide 30 toward the left until the stud 32 is brought to a stop by coming against the finger 29. The graduation designated by the pointer 36 will show clearly in diopters and fractions thereof the extent of the defect. Should the test reveal myopia, the scale 30 when shifted to the left will be brought to a stop when the first graduation on said scale registers with the pointer 36 and the distance between the pointer 36 and the indicator 13 will be indicated by diopters or fractions thereof.

Should it be desired to make the presbyopic test, the supplemental slide 31 is shifted until the last graduation thereon which is indicated by the numeral 3 and which is preferably in the form of an arrow, as shown at 37 in Fig. 4, is brought to position directly opposite the graduation on scale 30 designated by the indicator 13. For instance, if 3.00 diopters of myopia have been designated by the indicator 13, the supplemental slide 31 is shifted longitudinally until the arrow 37 is brought opposite the graduation indicating the third diopter on scale 30. The indicator 13 is then shifted to the extreme left at which time the target 19 is brought to a position 1.00 diopter distant from the lens 3. While the patient is looking through the lenses 4 and 3, the target 19 is gradually drawn away from the lenses to determine the *punctum proximum* or near point of distinct vision and should presbyopia be present the amount thereof will be indicated by the indicator or pointer 13 on the scale 31. By now leaving the parts in these positions it will be seen that two readings are indicated, to wit, the *punctum remotum* and the *punctum proximum* and it thus becomes an easy matter to prescribe the lenses necessary to correct the inaccuracies of vision indicated.

As herein stated, the apparatus can also be used in testing for astigmatism. In making this test, the astigmatic chart or target 19 is adjusted from the right to the left of the apparatus and is brought to a stop as soon as one set of lines on the chart are clearly seen by the patient. The main scale is then slid longitudinally until it is brought to a stop, thus indicating the most remote point at which the lines are first seen. The target is then again moved to the left until those lines on the chart which are at right angles to the ones first seen come into the range of vision and can be seen clearly. The movable indicator 13 will indicate this point of the chart on the main scale, said scale indicating the distance between the two indicated points in diopters and fractions thereof. The axes are found by the location of the lines last seen on the chart.

For the purpose of measuring the amplitude of accommodation, it is necessary to draw the indicator 13 and the main and secondary scales to the extreme right. The indicator is then moved slowly toward the left end of the apparatus and is brought to a stop as soon as the small letters on the chart or target can be seen clearly. The main scale is then moved to the left until brought to a stop. Thus the *punctum remotum* or distant point of vision is obtained. The target and its indicator 13 are then moved farther to the left until brought to their extreme positions, after which the target is started back toward the right end of the apparatus to the point at which the small letters on the chart or target are seen clearly, this being the *punctum proximum* or near point of vision. The indicator will designate on the main scale the amplitude or range of accommodation.
It might be stated that in constructing the apparatus for use, it has been found necessary to utilize a lens tube 10.00 diopters in length, a bi-convex lens of +10.00 diopters being placed in the inner end thereof while, in order to extend the range and power, a bi-concave lens of −6.00 diopters is located in the outer end of the tube thus placing the point of infinity directly under the pointer 36 which is 16.00 diopters forward from the front or convex lens.

It must be understood that "point of infinity" is the principal focus of the lens system and when the target is in the principal focal plane, the image of it is at infinity for a normal eye, *i. e.*, the rays issuing from the lens system and entering the eye of the patient are parallel.

What is claimed is:—

1. An optometer including lenses coöperating to locate the point of infinity, a fixed indicator designating said point, a target movable in either direction toward and past the point of infinity, an indicator movable with the target, and a sliding scale shiftable relative to the indicator and readable in connection therewith for designating in units of measurement and fractions thereof the presence of hypermetropia of myopia.

2. An optometer including lenses coöperating to locate the point of infinity, a fixed indicator designating said point, a target movable in either direction toward and past the point of infinity, an indicator movable with the target, and a scale divided into diopters and fractions thereof and movable one-half the length of movement of said indicator, said scale being readable with the fixed and movable indicators for designating in diopters and fractions thereof certain defects in vision.

3. An optometer including lenses coöperating to locate the point of infinity, a fixed indicator designating said point, a target movable in either direction toward and past the point of infinity, an indicator movable with the target, a sliding scale normally positioned relative to the fixed indicator to designate distances in diopters from the point of infinity, and means operated by the movement of the movable indicator in one direction, for shifting said scale relative to the fixed indicator.

4. An optometer including lenses coöperating to locate the point of infinity, a fixed indicator designating said point, a target movable in either direction toward and past the point of infinity, an indicator movable with the target, a sliding scale normally indicating distances in diopters from the point of infinity, said movable indicator being shiftable in one direction to designate myopia in diopters on the scale, means shiftable with the movable indicator for sliding the scale out of its normal position when said indicator is moved in one direction, thereby to indicate hypermetropia in diopters.

5. An optometer including lenses coöperating to locate the point of infinity, a fixed indicator designating said point, a target movable in either direction toward and past the point of infinity, an indicator movable with the target, a sliding scale normally indicating distances in diopters from the point of infinity, said movable indicator being shiftable in one direction to designate myopia in diopters on the scale, means shiftable with the movable indicator for sliding the scale out of its normal position when said indicator is moved in one direction, thereby to indicate hypermetropia in diopters, and a supplemental sliding scale having an indicator adapted to coöperate with the first mentioned scale and the movable indicator.

6. An optometer including lenses coöperating to locate the point of infinity, a fixed indicator designating said point, a target movable in either direction toward and past the point of infinity, an indicator movable with the target, a scale for indicating distances in diopters from the point of infinity to the *punctum remotum* and the *punctum proximum*, a presbyopic scale slidable relative to the first mentioned scale and having an indicator adapted to coöperate with the first mentioned scale and the movable indicator.

7. An optometer including a casing, a lens tube in one end thereof, lenses carried by said tube and coöperating to locate a point of infinity within the casing, connected slidable rods mounted within and outside of the casing, a target carried by the inner rod, an indicator carried by the outer rod, a stationary pointer indicating the point of infinity and located outside of the casing, a resetting finger movable with the outer rod, a main scale slidably mounted upon the casing and divided into diopters and fractions thereof, said scale being readable with the fixed and movable pointers for indicating myopia and hypermetropia, a presbyopic scale slidably mounted on the casing and having an indicator adapted to coöperate with the first mentioned scale and the movable indicator.

In testimony that I claim the foregoing as my own, I have hereto affixed my signature.

JACOB E. GOODMAN.